US012616104B2

(12) United States Patent
Sato

(10) Patent No.: US 12,616,104 B2
(45) Date of Patent: May 5, 2026

(54) GRAPE CULTIVATION METHOD

(71) Applicant: GreenStyle Co., Ltd., Nagano (JP)

(72) Inventor: Hironobu Sato, Nagano (JP)

(73) Assignee: GREENSTYLE CO., LTD., Ina (JP)

(*) Notice: Subject to any disclaimer, the term of this patent is extended or adjusted under 35 U.S.C. 154(b) by 0 days.

(21) Appl. No.: 18/936,849

(22) Filed: Nov. 4, 2024

(65) Prior Publication Data

US 2025/0151672 A1     May 15, 2025

(30) Foreign Application Priority Data

Nov. 15, 2023    (JP) ................................. 2023-194240

(51) Int. Cl.
*A01G 17/02*         (2006.01)
*A01G 17/06*         (2006.01)

(52) U.S. Cl.
CPC ............. *A01G 17/02* (2013.01); *A01G 17/06* (2013.01)

(58) Field of Classification Search
CPC ...... A01G 17/005; A01G 17/02; A01G 17/04; A01G 17/08; A01G 17/10
See application file for complete search history.

(56) References Cited

U.S. PATENT DOCUMENTS

| | | | | |
|---|---|---|---|---|
| 2018/0271028 A1* | 9/2018 | Gilley | ....................... | A01G 7/06 |
| 2018/0303043 A1* | 10/2018 | Wimbush, Sr. | ........ | A01G 17/10 |
| 2020/0128762 A1* | 4/2020 | Fullerton | ............. | A01G 13/262 |
| 2020/0275616 A1* | 9/2020 | Liao | ........................ | A01G 17/10 |

FOREIGN PATENT DOCUMENTS

| | | | | | | |
|---|---|---|---|---|---|---|
| AT | 16792 U1 | * | 9/2020 | ............ | A01G 17/10 |
| CN | 104322344 A | * | 2/2015 | ............ | A01G 17/02 |
| CN | 111264270 A | * | 6/2020 | ............ | A01G 17/10 |
| CN | 111264285 A | * | 6/2020 | ............ | A01G 13/00 |
| CN | 116210521 A | * | 6/2023 | ............ | A01G 13/21 |
| DE | 20004903 U1 | * | 5/2000 | ............ | A01G 13/27 |
| EP | 4201168 A1 | * | 6/2023 | ............ | A01G 17/02 |
| KR | 20140094242 A | * | 7/2014 | ......... | A01G 17/005 |
| WO | WO-2019207535 A1 | * | 10/2019 | ............ | A01G 17/02 |
| WO | WO-2020032817 A1 | * | 2/2020 | ............ | A01G 17/02 |

OTHER PUBLICATIONS https://vieillevigne.net/systeme-palissage; Burgundy Côte de Nuits Vineyard Observation Guidebook; vieillevigne.net; retrieved Nov. 4, 2024.

* cited by examiner

*Primary Examiner* — Monica L Perry
*Assistant Examiner* — Aaron M Rodziwicz
(74) *Attorney, Agent, or Firm* — Farber LLC

(57)        ABSTRACT

In a grape cultivation method providing improving workability, posts are provided in a standing manner in the ground. Then, a plurality of wires are attached at predetermined intervals in a direction orthogonal to the posts. As a result, a trellis is constructed. In attaching a young grapevine to the trellis, first, a trunk of the young grapevine is bent at a predetermined angle θ in advance. Then, a primary scaffold branch of the young grapevine is attached to a first line among the plurality of wires so that the predetermined angle θ becomes a training angle.

2 Claims, 12 Drawing Sheets

GRAPE CULTIVATION METHOD

FIELD OF THE INVENTION

The present invention relates to grape cultivation.

BACKGROUND OF THE INVENTION

As a grape cultivation method, a method of performing a vertical shoot positioning (VSP) training system is known (see Non-Patent Document 1, for example). The VSP training system will be described in detail with reference to FIG. 10. First, a trellis 1 shown in FIG. 10 is constructed. As shown in FIG. 10, the trellis 1 is provided with a plurality of posts 10 (two in the figure) spaced at fixed intervals in a standing manner in the ground G. As shown in FIG. 10, a plurality of wires 11 (three in the figure) are attached at predetermined intervals in a direction orthogonal to the posts 10 so as to span the posts 10.

Thus, the trellis 1 is constructed in this manner. In the present embodiment, among the plurality of wires 11 shown in FIG. 10, a wire 11 closest to the ground G is referred to as a first line 11*a*, a wire 11 next closest to the ground G is referred to as a second line 11*b*, and a wire 11 next closest to the ground G is referred to as a third line 11*c*.

Incidentally, a young grapevine 2 shown in FIG. 10 is attached to the trellis 1 thus constructed, whereby the VSP training system is performed. As shown in FIG. 10, the young grapevine 2 is composed of a trunk 20 and primary scaffold branches 21, the trunk 20 is planted in the ground G in a standing manner, and the primary scaffold branches 21 are trained so as to form a T shape and are attached to the first line 11*a*.

In this way, the T-shaped VSP training system is performed.

The Non-Patent Document 1 cited herein refers to "6. Vertical Shoot Positioning Training System and Basics of Trellising", [online], Vieille Vigne, [Searched on Nov. 13, 2023], Internet (https://vieillevigne.net/systeme-palissage/)

SUMMARY OF THE INVENTION

However, the T-shaped VSP training system as described above has a problem of being too particular about the T shape, making it difficult to harvest grapes. Furthermore, there is a problem that the primary scaffold branches 21 are forcibly bent due to being too particular about the shape, damaging the primary scaffold branches 21, which may cause redoing of the work.

Furthermore, in the T-shaped VSP training system, if no work is done, as shown in FIG. 11, a secondary scaffold branch 22 in which grapes will grow will come out at the tip and the base, and as for a secondary scaffold branch in the intermediate portion, only a thin secondary scaffold branch 23 in which no grapes will grow will come out as shown in a portion of the arrow A due to the basal dominance and the apical bud dominance of the young grapevine 2. Note that the thin secondary scaffold branch 23 remains this thin even though one to two years have passed since the trunk 20 was planted in the ground G and the harvesting time of grapes has already passed.

However, it is known that good grapes are more likely to grow when the secondary scaffold branch 23 in the intermediate portion is grown to be a solid branch like the secondary scaffold branch 22 as shown in FIG. 11 (a branch with a diameter of about 10 mm is preferable because good grapes will not grow if the branch is too thick). Therefore, in order to make such a branch, it is necessary to carry out work called bud notching and work such as spraying a chemical called CX-10 that promotes forced germination. If this work is neglected, there is a problem that grapes will not grow, or even if they do, they will not be of good quality.

From the above, the T-shaped VSP training system as described above has the problem of poor workability in general.

Accordingly, in view of the foregoing problems, an object of the present invention is to provide a grape cultivation method capable of improving workability.

The foregoing object of the present invention is achieved by the following means. Note that reference signs in the embodiment to be described later are added in parentheses, but the present invention is not limited thereto.

According to a grape cultivation method according to the invention of claim 1, in attaching a young grapevine (3) to a trellis (1) in which a plurality of lines (wires 11) are attached to posts (10) provided in a standing manner in a ground (G), at predetermined intervals in a direction orthogonal to the posts (10), first, a trunk (30) of the young grapevine (3) is bent at a predetermined angle (θ) in advance, and a primary scaffold branch (31) of the young grapevine (3) is attached to a line (a first line 11*a*) closest to the ground (G) among the plurality of lines (11) so that the predetermined angle (θ) becomes a training angle.

According to the invention of claim 2, the predetermined angle (θ) is 40° to 50° in the grape cultivation method according to claim 1.

Next, advantageous effects of the present invention will be described with reference signs of the drawings. Note that reference signs in the embodiment to be described later are added in parentheses, but the present invention is not limited thereto.

According to the invention of claim 1, the trunk (30) of the young grapevine (3) only needs to be bent by a predetermined angle (θ) in advance, so that there is no possibility of damaging the primary scaffold branch (31) by forcibly bending the primary scaffold branch (31) due to being particular about the shape, unlike the conventional case. Furthermore, it is no longer necessary to carry out work called bud notching and work such as spraying a chemical called CX-10 that promotes forced germination, unlike the conventional case.

Therefore, according to the present invention, the workability can be improved.

According to the invention of claim 2, the secondary scaffold branches (32) come out almost evenly, so that good grapes are more likely to grow.

DETAILED DESCRIPTION OF THE PREFERRED EMBODIMENTS AND METHODS

Hereinafter, an embodiment of the grape cultivation method according to the present invention will be specifically described with reference to the drawings. Note that in the following description, when directions up, down, left, and right are indicated, it shall mean up, down, left, and right when viewed from the front of the figure.

The grape cultivation method according to the present embodiment can improve the workability. Specifically, a young grapevine 3 composed of a trunk 30 and a primary scaffold branch 31 shown in FIG. 1(*a*) is prepared, and the trunk 30 is bent in advance at a predetermined angle θ (0<θ<90°) with respect to the vertical direction.

Figure 1A:
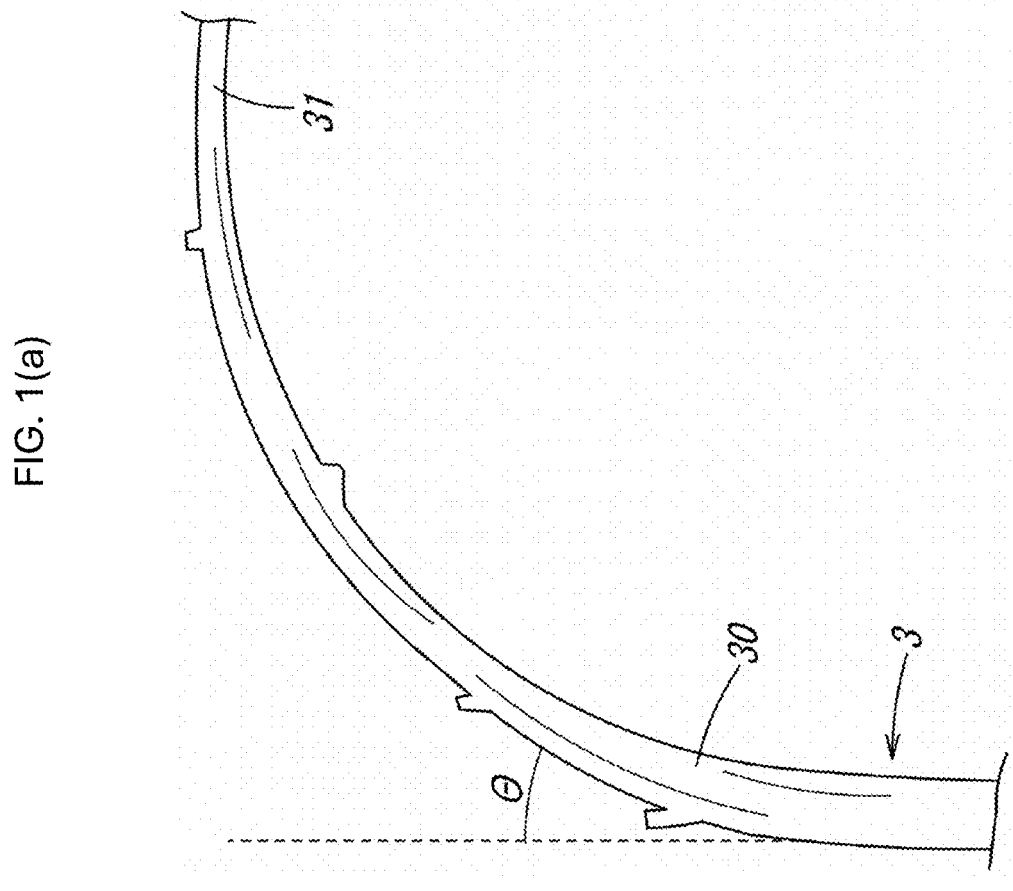
FIG. 1(*a*) and FIG. 1(*b*) are explanatory diagrams for explaining a grape cultivation method according to an embodiment of the present invention, in which FIG. 1(*a*) is a front view showing a part of a young grapevine bent at a predetermined angle and FIG. 1(*b*) is a front view showing a part of a state in which the young grapevine bent at the predetermined angle is attached to a trellis.
Figure 1B:
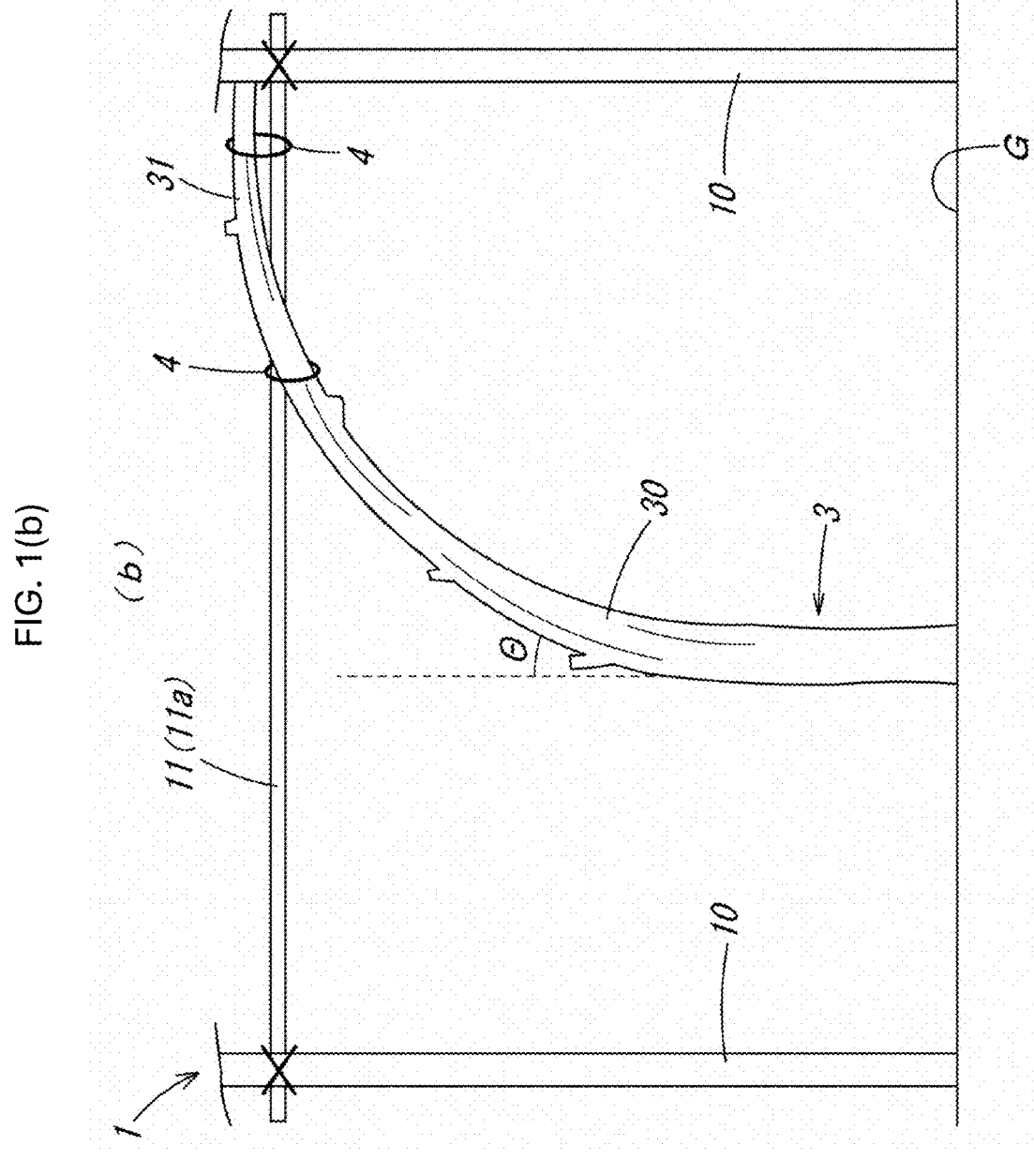

Then, the young grapevine 3 bent at the predetermined angle θ in advance in this manner is attached to a trellis 1 shown in FIG. 1(*b*). Specifically, as shown in FIG. 1(*b*), the trunk 30 is planted in the ground G, and the primary scaffold branch 31 is attached to a first line 11*a* with bands 4 such as string so that the predetermined angle θ becomes a training angle with respect to a post 10.

In this way, without having to carry out work called bud notching and work such as spraying a chemical called CX-10 that promotes forced germination, secondary scaffold branches come out almost evenly without being biased to the tip and the base of the young grapevine 3. This is considered to be because the physiology of the young grapevine 3, which is the apical dominance, apical bud dominance, and basal dominance, is well balanced, and as a result, the secondary scaffold branches come out evenly.

Therefore, when the grape cultivation method described above is performed, the trunk 30 only needs to be bent in advance at a predetermined angle θ (0<θ<90°) with respect to the vertical direction, and thus, there is no possibility of damaging the primary scaffold branch 31 by forcibly bending the primary scaffold branch 31 due to being particular about the shape, unlike the conventional case. Furthermore, it is no longer necessary to carry out work called bud notching and work such as spraying a chemical called CX-10 that promotes forced germination, unlike the conventional case. When the secondary scaffold branches come out almost evenly, the nutritional imbalance is eliminated, whereby good grapes are more likely to grow.

Therefore, according to the present embodiment, the workability can be improved. Note that in the present embodiment, an example is shown in which the trunk 30 is bent to the right in the figure at a predetermined angle θ with respect to the vertical direction, but it is a matter of course that the trunk 30 may be bent to the left in the figure.

Here, the present inventor conducted the following experiment in order to confirm the above.

Figure 2:
FIG. 2 is a photographic diagram showing a state in which one to two months have passed since a young grapevine bent at 20° was attached to a trellis.
Figure 3:
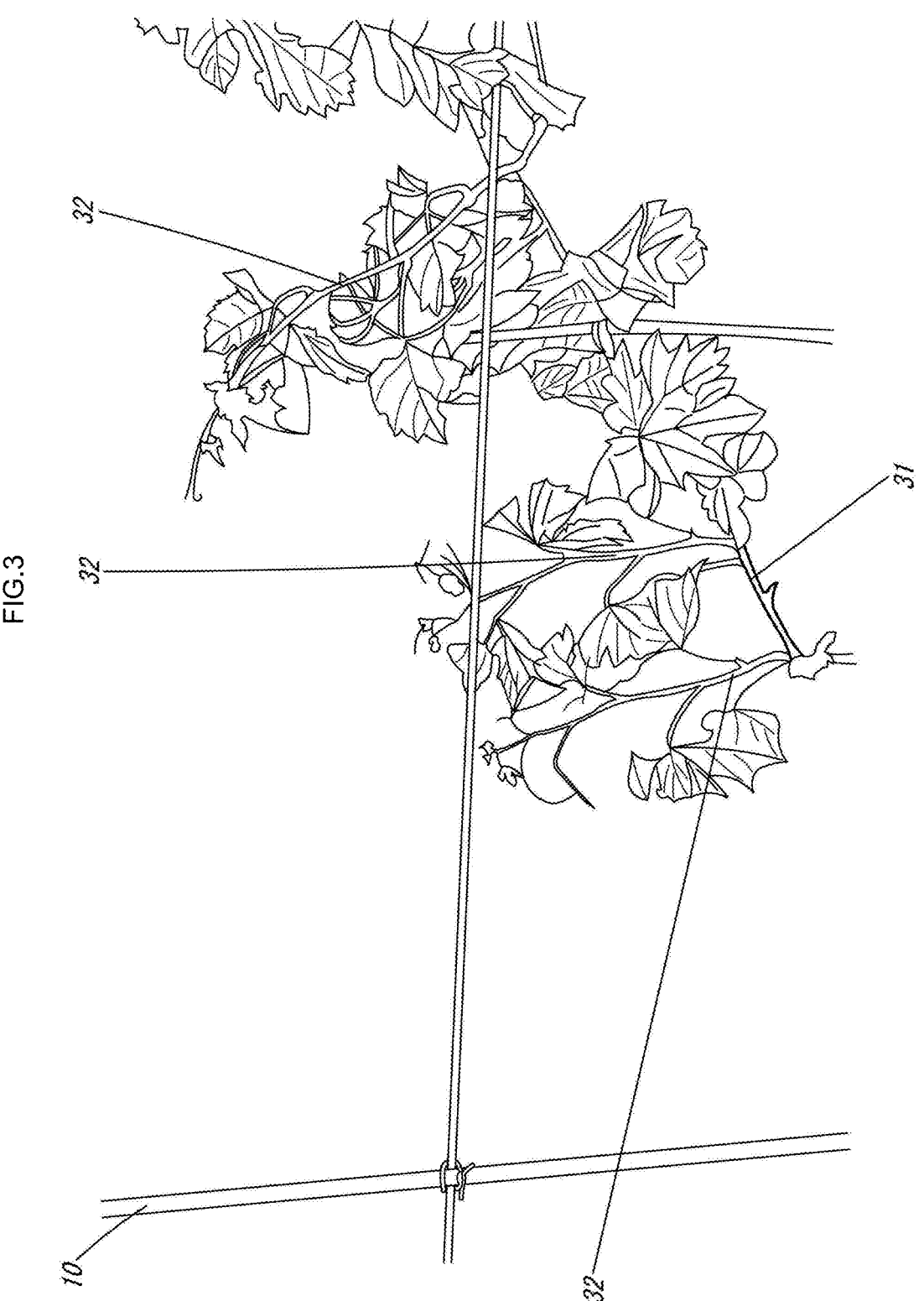
FIG. 3 is a photographic diagram showing a state in which one to two months have passed since a young grapevine bent at 30° was attached to a trellis.
Figure 4:
FIG. 4 is a photographic diagram showing a state in which one to two months have passed since a young grapevine bent at 40° was attached to a trellis.
Figure 5:
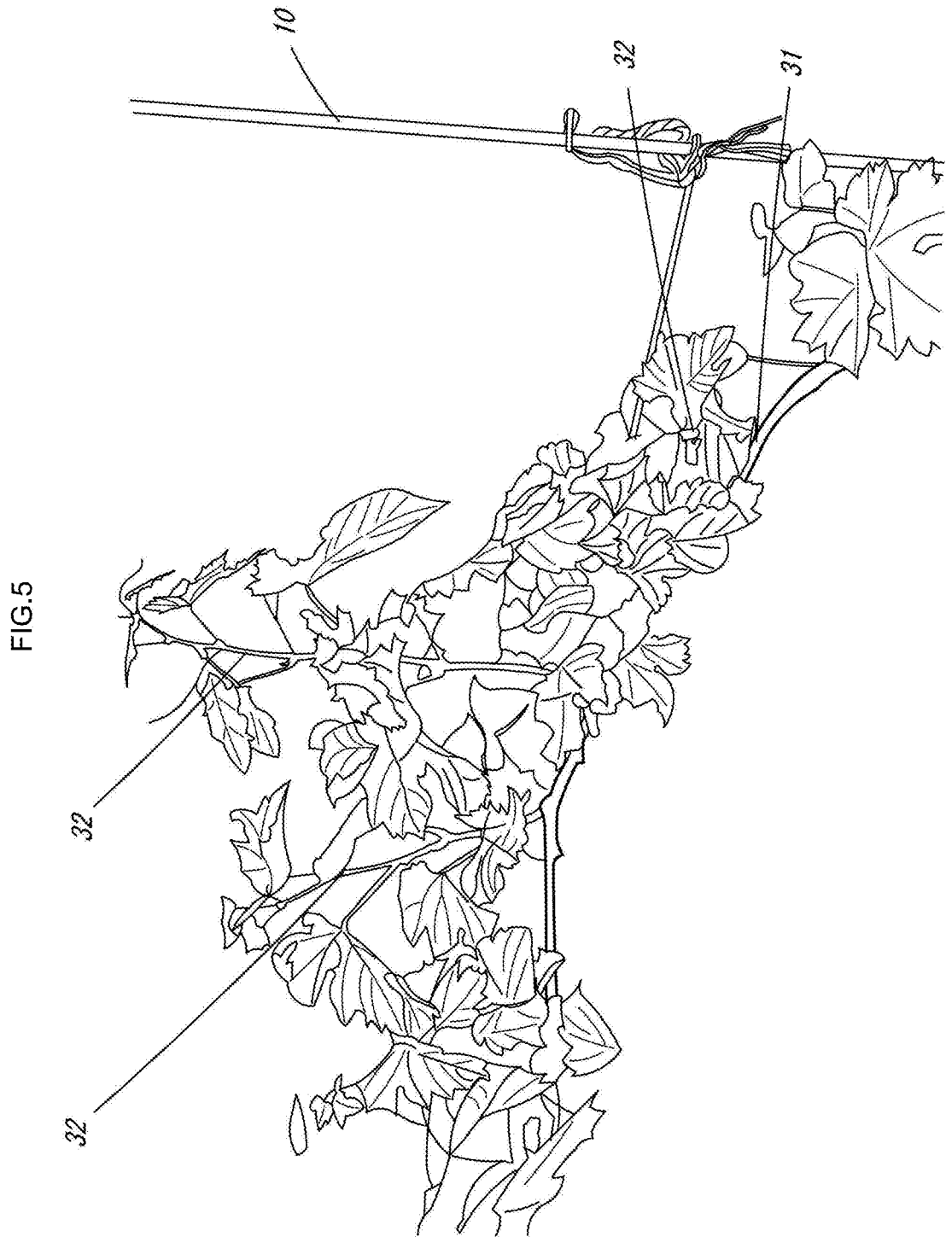
FIG. 5 is a photographic diagram showing a state in which one to two months have passed since a young grapevine bent at 45° was attached to a trellis.
Figure 6:
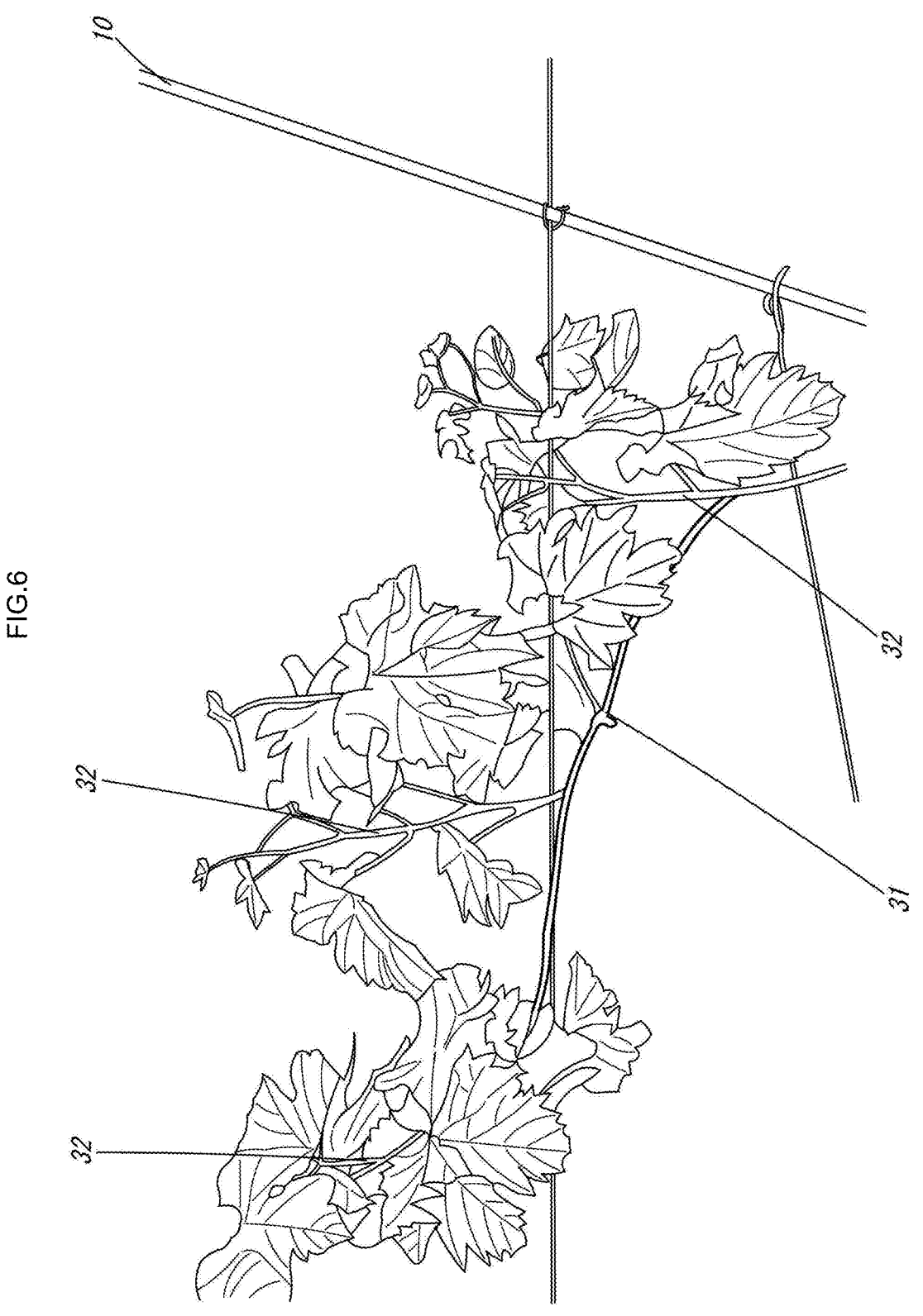
FIG. 6 is a photographic diagram showing a state in which one to two months have passed since a young grapevine bent at 50° was attached to a trellis.
Figure 7:
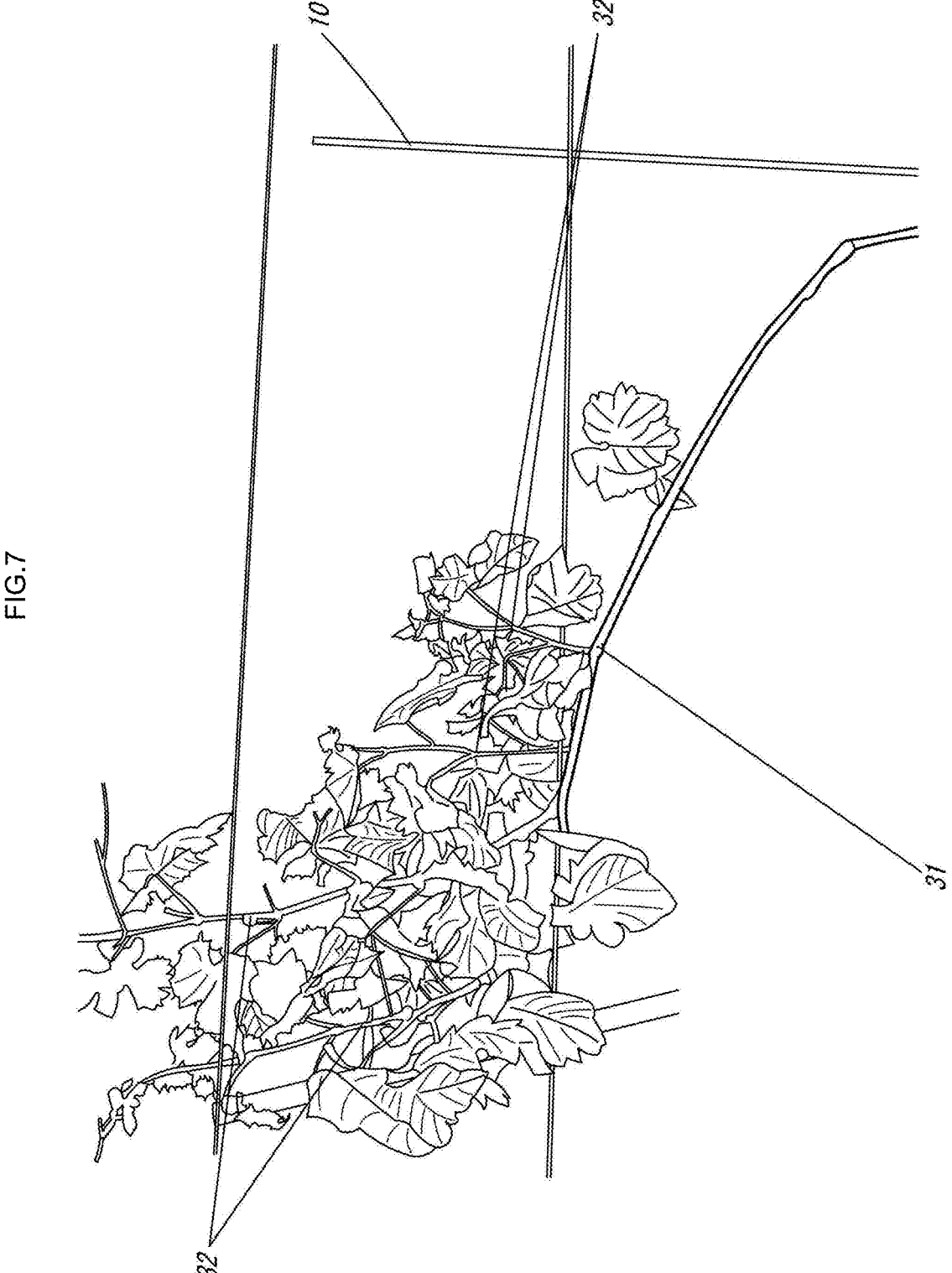
FIG. 7 is a photographic diagram showing a state in which one to two months have passed since a young grapevine bent at 60° was attached to a trellis.

The present inventor started an experiment in a test field in Shiojiri City, Nagano Prefecture in Aril 2023 using the grape cultivation method described above. As a result, the results as shown in FIG. 2 to FIG. 7 were obtained on May 31, 2023. FIG. 2 shows a young grapevine bent at 20° as a predetermined angle. FIG. 3 shows a young grapevine bent at 30° as a predetermined angle. FIG. 4 shows a young grapevine bent at 40° as a predetermined angle. FIG. 5 shows a young grapevine bent at 45° as a predetermined angle. FIG. 6 shows a young grapevine bent at 50° as a predetermined angle. FIG. 7 shows a young grapevine bent at 60° as a predetermined angle.

Figure 11:
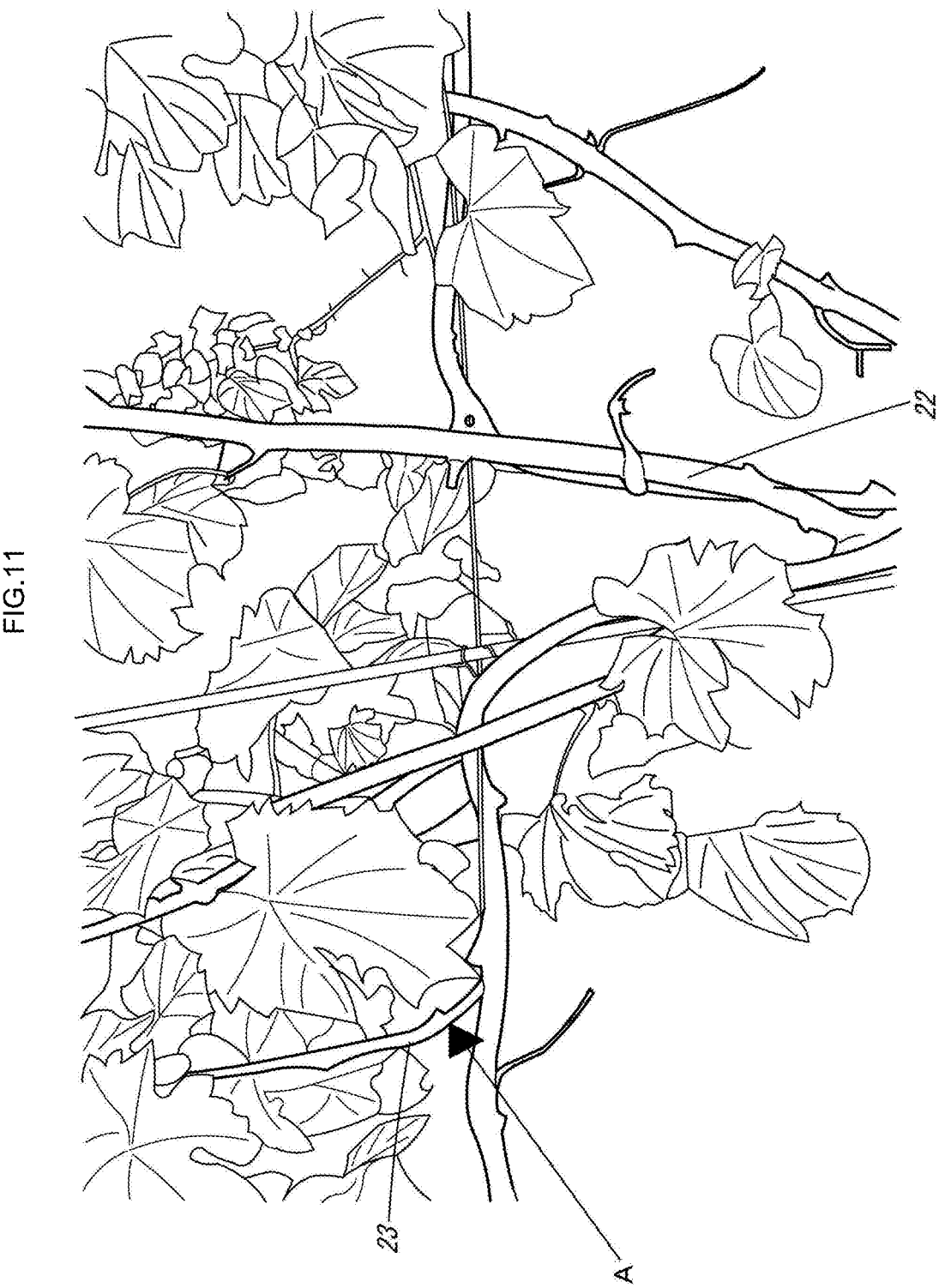
FIG. 11 is a photographic diagram showing a state of growth by the T-shaped VSP training system.

With reference to FIG. 2 to FIG. 7, it can be seen that secondary scaffold branches 32 thicker than the secondary scaffold branch 23 shown in FIG. 11 come out not only at the tip and the base but also in the intermediate portion although only about one to two months have passed since the trunk 30 was planted in the ground G. Thus, it has been found that the thick secondary scaffold branches 32 come out without carrying out work called bud notching and work such as spraying a chemical called CX-10 that promotes forced germination, unlike the conventional case.

Thus, according to the present embodiment, it has been found that workability is improved since it is no longer necessary to carry out work called bud notching and work such as spraying a chemical called CX-10 that promotes forced germination, unlike the conventional case.

From the viewpoint of evenness, it can be seen that the secondary scaffold branches 32 shown in FIG. 4 to FIG. 6 come out almost evenly. It can be seen that, for the secondary scaffold branches 32 shown in FIG. 2 and FIG. 3, the secondary scaffold branches at the tip portion (right side in the figures) grow faster than other secondary scaffold branches 32 and for the secondary scaffold branches 32 shown in FIG. 7, the secondary scaffold branches at the tip portion (left side in the figure) also grow faster than other secondary scaffold branches 32. Therefore, from the viewpoint of evenness, it can be seen that the secondary scaffold branches 32 shown in FIG. 4 to FIG. 6 come out almost evenly.

Therefore, it can be seen that good grapes are more likely to grow since the secondary scaffold branches 32 shown in FIG. 4 to FIG. 6 come out almost evenly.

Accordingly, from the above experimental results, it was found that the predetermined angle is preferably 40° to 50°.

Figure 8:
FIG. 8 is a photographic diagram showing a state in which grapes of a variety called Pinot Noir are ripening.
Figure 9:
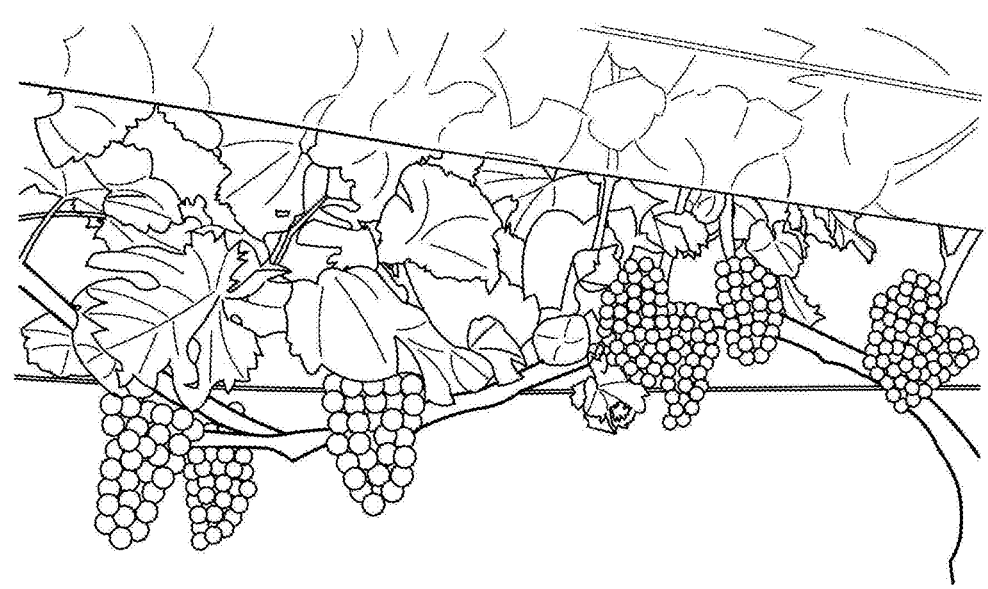
FIG. 9 is a photographic diagram showing a state in which grapes of a variety called Gewürztraminer are ripening.
Figure 10:
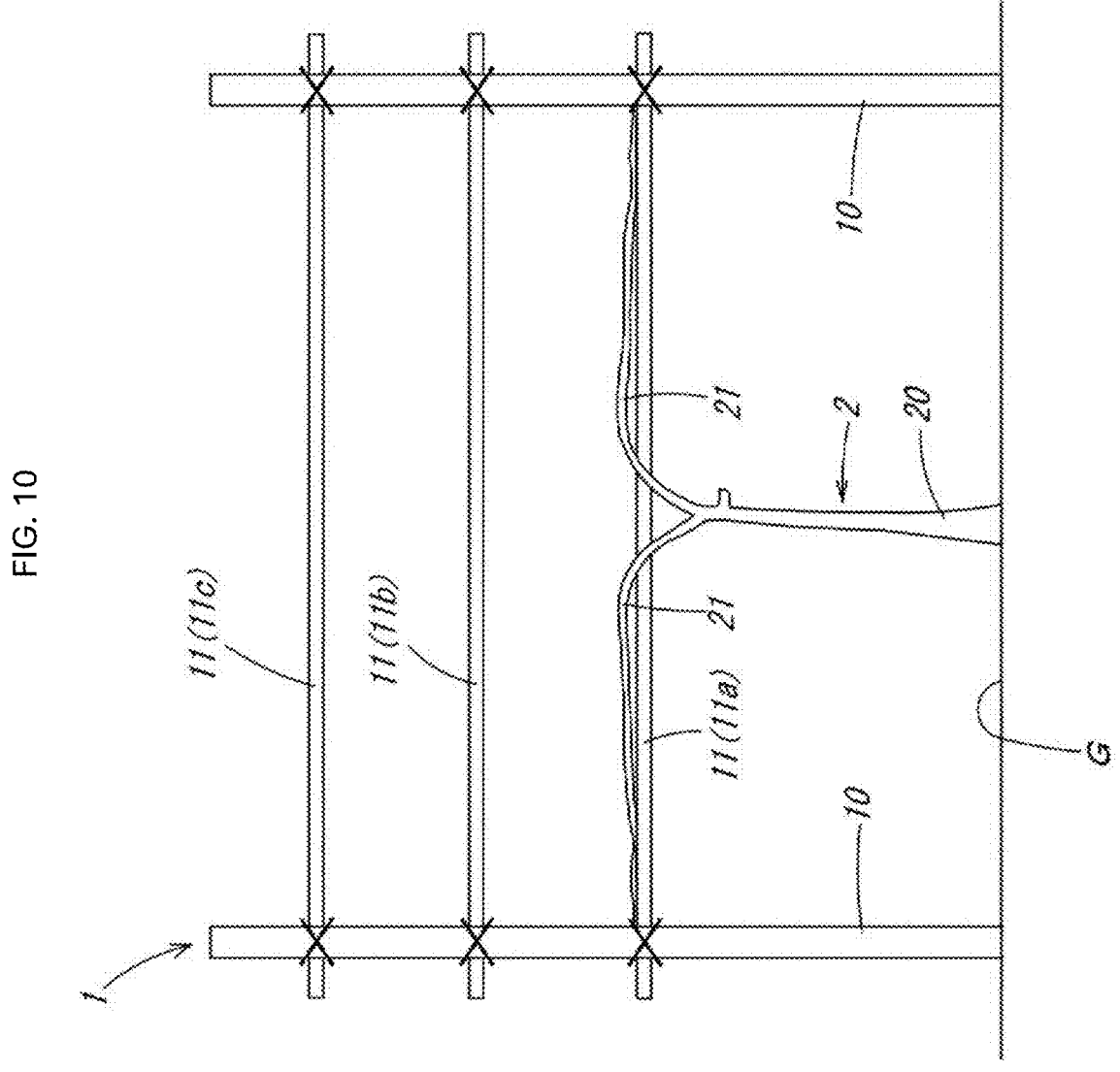
FIG. 10 is an explanatory diagram for explaining a T-shaped VSP training system.

Further, grapes ripening on the trunk 30 planted in the ground G at an angle determined to be preferable from the above experimental results are shown in FIG. 8 and FIG. 9. FIG. 8 shows a state in which grapes of a variety called Pinot Noir are ripening. FIG. 9 shows a state in which grapes of a variety called Gewürztraminer are ripening. Grapes start to bear fruit from the fourth year in the conventional grape cultivation method, whereas grapes are already bearing fruit in the second year.

As for the harvested amount, 300 vines of a variety called Pinot Noir were planted per 1,000 square meters, and the average yield per vine was 575 g/vine, so that the harvested amount was about 173 kg. Further, 300 vines of a variety called Gewürztraminer were planted per 1,000 square meters, and the average yield per vine was 316 g/vine, so that the harvested amount was about 95 kg.

From the above, it can be said that the grape cultivation method according to the present embodiment can produce a high yield at an early stage.

Note that in the present embodiment, the wires 11 are illustrated as an example in constructing the trellis 1, but any material other than wires may be used as long as it can form a line.

What is claimed is:

1. A grape cultivation method, comprising:

attaching a young grapevine to a trellis in which a plurality of lines are attached to posts provided in a standing manner in a ground, with the lines being at predetermined intervals in a direction orthogonal to the posts;

prior to the attaching step, first, bending a trunk of the young grapevine at a predetermined angle ($\theta$) in advance, attaching a primary scaffold branch of the young grapevine to a line closest to the ground among the plurality of lines so that the predetermined angle ($\theta$) becomes a training angle;

attaching the primary scaffold branch so as to be aligned with the line closest to the ground;

the predetermined angle ($\theta$) being formed when the trunk of the young grapevine is bent with respect to a vertical direction from a predetermined point of the trunk of the young grapevine, and is formed between the vertical direction and a tangential direction of the trunk of the young grapevine; and a linear distance from the ground toward the line closest to the ground to the predetermined point on the trunk of the young grapevine being shorter than a linear distance from the line closest to the ground toward the ground to the predetermined point on the trunk of the young grapevine.

2. The grape cultivation method according to claim 1, wherein the predetermined angle ($\theta$) is 40° to 50°.

\* \* \* \* \*